United States Patent [19]

Barreau et al.

[11] 4,197,029
[45] Apr. 8, 1980

[54] CONNECTOR SYSTEM FOR FURNITURE AND STRUCTURES

[75] Inventors: Jean-Marc Barreau, Surgeres; Jean-Claude Petit, Saint Sauveur, both of France

[73] Assignee: Gacon S.A., Surgeres, France

[21] Appl. No.: 905,370

[22] Filed: May 12, 1978

[30] Foreign Application Priority Data

Aug. 11, 1977 [DE] Fed. Rep. of Germany ....... 2749862

[51] Int. Cl.$^2$ .............................................. F16B 13/00
[52] U.S. Cl. .................................... 403/253; 403/316; 403/407
[58] Field of Search ............... 403/353, 405, 406, 407, 403/231, 187, 254, 255, 253, 287, 316; 248/239

[56] References Cited

U.S. PATENT DOCUMENTS

| 2,424,602 | 7/1947 | De Swart | 248/239 UX |
| 3,487,446 | 12/1969 | Hero et al. | 248/239 X |
| 3,580,535 | 5/1971 | Naske | 248/239 |

FOREIGN PATENT DOCUMENTS

| 2209508 | 9/1972 | Fed. Rep. of Germany | 403/254 |
| 180020 | 12/1935 | Switzerland | 403/353 |

Primary Examiner—Andrew V. Kundrat
Attorney, Agent, or Firm—Brisebois & Kruger

[57] ABSTRACT

A connector system including a socket with a retaining flange to hold the socket in an opening in one of the parts to be joined. A plug with a longitudinal slot is wedged in an opening of the other part to be joined. A head on the plug coacts with a bayonnet slot opening of the socket to secure the parts together. The wedge for securing the plug can be connected to the plug initially with a break-away connection so the entire plug is a single unit. A disk retained in the socket assists holding the socket in the other part to be joined.

15 Claims, 6 Drawing Figures

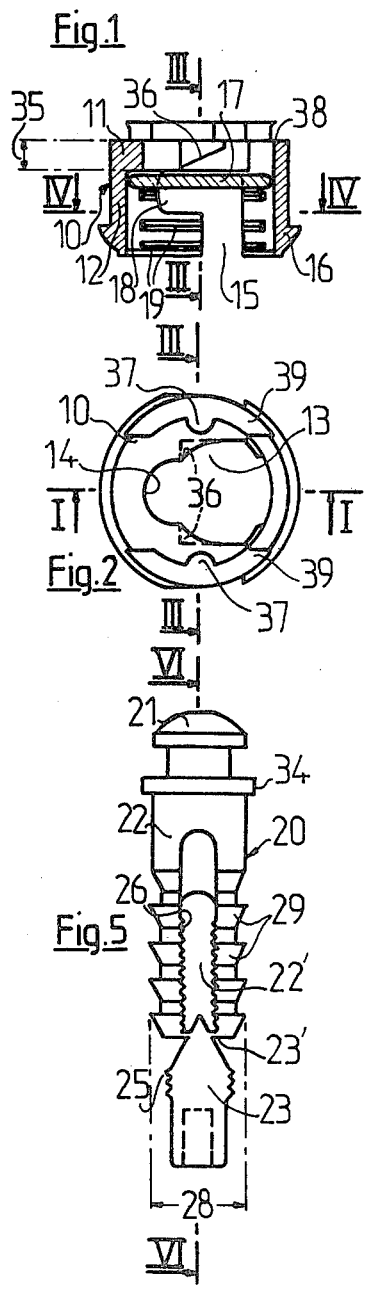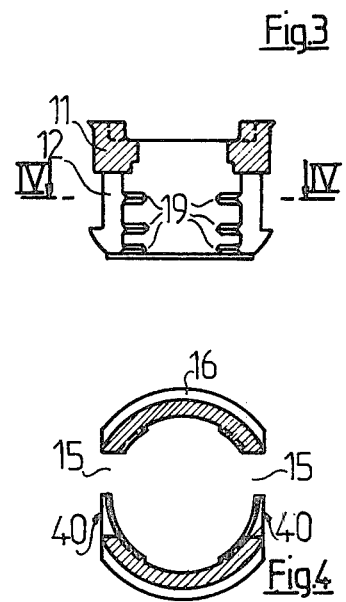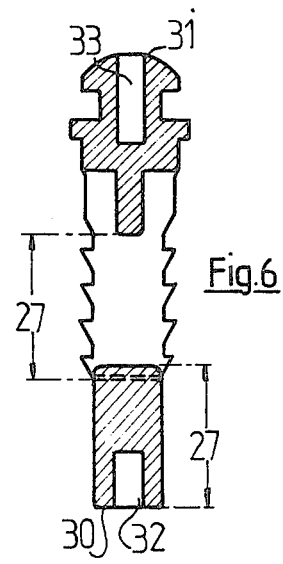

CONNECTOR SYSTEM FOR FURNITURE AND STRUCTURES

The present invention relates to a device for assembling two elements of furniture or of other construction, in particular, two perpendicular walls or other members. Known devices of this type (French Pat. No. 70 36 156) include a cup-shaped cylindrical sleeve inserted in an opening of the wall and whose end is essentially flush with the surface of the wall. The end has a large diameter opening joining a small diameter opening. There is also a plug with a head to fit in the opening, the shaft of the plug having a slot open toward its end and toward its sides, and there are saw-toothed locking grooves on the outer surface of the plug.

To fasten these two assembly elements to each other, holes are formed in the two elements of furniture or of construction to be assembled, one for the sleeve and one for the plug. The sleeve is fastened into its hole by means of two nails or points and the plug is secured by a screw which traverses its length.

The invention improves this prior construction which has the following drawbacks:

The assembly device includes not only the two previously-mentioned elements, but also their fastening means, that is, the nails and the screws, which must be used for assembly; however, the fastening is not certain, for in spite of the ribs or locking projections provided on the elements, they do not wedge but must usually be glued, so that in the event of strong pull, which especially applies to the parts of a bed, they pull away. To avoid this, relatively large holes must be provided on the sleeve, which requires increasing the sleeve diameter.

A specific object of the invention is to provide two assembling elements which can be mounted without additional parts, the necessary fastening means being integral with the assembling elements when delivered and before mounting. In addition, the fastening security of the assembling elements in the parts to be assembled, must also be augmented by a strong spreading apart or wedging effect. Finally, the invention permits substantially reducing the diameter of the sleeve of the known type in order to be able to use the device on front surfaces of thin platelike construction elements.

The invention attains these results due to the fact that not only the shaft of the plug (as is the case of the known embodiment) is slotted by the cylindrical wall of the sleeve also has slots, and the open end of the sleeve is provided with at least one locking flange and with saw-teeth projecting radially, while near the head of the sleeve is a spacing disk adjustable toward the open end of the sleeve and initially connected to the sleeve. In a similar way, at the end of the slot provided in the shaft of the plug, is, removably connected to the plug, a wedge whose section corresponds essentially to that of the shaft.

Such an arrangement allows the introduction of the sleeve in the hole, the locking flange, because of the slots and the elasticity of the material, being set toward the inside and then being solidly anchored in the hole by advance of the spacing disk. To fasten the plug it is sufficient to push the plug into its hole so the wedge abuts against the end of the hole, thus penetrating into the plug while advance of the plug is continued, to spread the shaft in the same way as the sleeve. The two elements are thus fastened in a secure fashion, without the use of nails or screws, the assembly being achieved in an extremely simple and rapid way by introduction of the assembling elements into their respective holes and generally by application of a single vigorous blow on each of them.

To better understand the invention, an embodiment of the invention, shown in the attached drawings, will now be described, purely as an illustrative and a non-limiting example.

In these drawings:

FIG. 1 is an axial section of the sleeve of the assembling device of the invention;

FIG. 2 is a top plan view of the sleeve of FIG. 1;

FIG. 3 is a sectional view taken along line III—III of FIG. 1;

FIG. 4 is a sectional view taken along line IV—IV of FIG. 1;

FIG. 5 is a view in elevation of a plug of the assembling device of the invention; and FIG. 6 is a sectional view taken along line VI—VI of FIG. 5.

As can be seen in FIGS. 1 through 4, the cup-shaped sleeve 10 is composed of head end 11 and a cylindrical wall 12. The end has a bayonet slot circular opening with a portion 13 to receive the head of the plug shown in FIGS. 5 and 6, this opening 13 communicating with another opening 14 of smaller diameter, to receive the shaft of the plug.

As shown at FIGS. 1 and 4, the cylindrical wall 12 is, according to the invention, provided with slots 15, and the open end of the sleeve—that is, the free rim of the cylindrical wall—comprises a serrated locking flange 16 which projects radially (FIGS. 1 and 4), while below head end 11 of the cup-shaped sleeve is a spacing disk 17 whose edge is semi-circular.

The number of slots 15 according to the invention depends on the dimensions of and on the elasticity of the sleeve 10. In the present case, one simply provides, in the wall of the sleeve, two slots, parallel to the axis of the sleeve and opposite to each other. Generally this is sufficient to avoid unnecessary weakening of the wall of the sleeve, while providing a maximum total length of the locking flange.

To enhance the elasticity of the sleeve, especially where a rigid plastic material is used for the manufacture of the sleeve, the above-mentioned slots 15, made parallel to the axis are extended into radial slots 18 each extending in the same peripheral direction.

In order to prevent the spacing disk 17 from separating from the sleeve during transport of the assembling device, the diameter of the spacing disk and the inside diameter of the sleeve are, preferably, such that the spacing disk is a tight fit in the area at the end of the sleeve. In addition, advantageously provided inside the sleeve are circumferential locking ribs 19 (FIG. 3) positioned in the zone of slots 15. The upper-most locking ribs 19 shown in FIG. 3 prevent the disk from coming out during transport, while the central and lower locking ribs secure the disk in a definitive locking position, the locking then being readily detected by the user.

Such longitudinal slots are, certainly, already known but they have not been applied to an assembling device for elements of furniture according to the embodiment of the invention. In their present configuration, they have not to date been provided on sleeves but only on plugs. The inventiveness of the invention is in the cooperation of the spacing disk with the wall of the sleeve which is provided with slots and a locking flange.

The plug mentioned above and used with the sleeve will now be described by referring to FIGS. 5 and 6, which show a plug which constitutes a notable improvement in relation to plugs of known types.

Plug 20 is made of a head 21 and a shaft or body 22. Shaft 22 has a slot 22'. The plug is made of moldable material, in particular of a material moldable by injection such as a plastic material, which is likewise used for the manufacture of the sleeve. A wedge 23 is directly molded, according to this invention, at the free end of the shaft, this wedge being joined to the shaft by weakened zones 23' which can be broken to enable the wedge to act. Thus as can be seen in FIGS. 5 and 6, the wedge is a flat wedge which is held in a secure manner, after its introduction into slot 22', by locking ribs 25, 26 provided respectively on the wedge and on the inner walls of the slot. The length 27 of wedge 23 corresponds to the length 27 of slot 22', so that, when plug 20 is engaged in a hole made in the corresponding element of furniture or of construction, and whose diameter corresponds to the outside diameter 28 of locking teeth 29 encircling the shaft whose depth is precisely determined, the weakened zones 23' are broken, and the plug then slides over the wedge, to force the wedge and its locking teeth into the plug slot to insure the rigid anchoring of the plug.

An axial hole 32 is made on the end face 30 of wedge 23, and an axial hole 33 is formed on front surface 31 of head 21, these holes providing radial elasticity to the parts situated in these areas.

The shaft comprises, in the area where it joins with the head of the plug, a flange 34 spaced from the head 21 by a distance which corresponds to the thickness 35 of head end 11 (FIG. 1) of the sleeve. This thickness 35 of the end is provided solely in the area of the opening 14 of the sleeve which receives the shaft (FIG. 2), while the thickness of the sleeve end in the area of opening 13 which receives the head 21 is smaller. An inclined transition surface 36 (FIG. 1) is provided between the two opening portions. Thus, the head of the plug can be introduced without difficulty into the opening 13. Then, by a lateral displacement toward opening 14 the said head engages the tapered surface 36 in the transition zone and is pulled inwardly with prestress in the end of the sleeve. This elastic introduction is facilitated by the axial hole 33 in the head of the plug.

As shown at FIG. 2, extending from the wall of end 11 of the sleeve are two stops 37 which extend radially inwardly and whose spacing is such that they act as catches or retainers in the extreme seated position of the head 21 of the plug and prevent it from returning to the opening 13. The locking stops 37 are supported by the exterior wall 38 of the end of the sleeve, and are reinforced by two annular segments 39 which project axially outwardly in relation to the end of the sleeve and which are each integral with the locking stops and the sleeve. The axial height of the stops 37 and of the annular segments 39 corresponds to the thickness of the flange 34 of the plug, the stops having a free space between them which is slightly less than the diameter of the flange so that the flange is tightly gripped.

Use of the assembling device on thin walls or other elements to be connected is enhanced by two plane exterior walls 40 parallel to each other and to the axis of the sleeve.

As follows in particular from the embodiment described above and from the drawings, the device of the invention has, in addition to the already mentioned advantages, that of being perfectly invisible, for it is entirely covered by the assembled parts. The device of the invention likewise allows a surface against surface connection between parts without any increased thickness, for example between two planks, so that the walls can be connected as extensions of each other.

What is claimed is:

1. A connector system for joining two parts, for example furniture parts, comprising:

a cylindrical socket having a side wall and a connecting end, and adapted to be inserted in one of the parts to be joined with its connecting end flush with the surface of the part, said connecting end having a bayonet slot opening, said side wall having a longitudinal slot and a radially projecting saw-tooth shaped locking flange at its free end, a spacer disk within said side wall of said socket and adjacent an inner surface of the connecting end of the socket, and means for retaining said spacer disk in said socket, a plug having a body adapted to be inserted and locked in the other of the parts to be joined and comprising, a head connected to the body by a stem, said head having a diameter to be received in a larger diameter opening of the bayonet slot and lock behind a smaller diameter opening of the slot, and said stem having a diameter corresponding to the diameter of the smaller diameter opening of the bayonet slot, said body having a diameter to be inserted in an opening of said other part to be joined, and means for securing the body in said other part, said parts being joined by inserting the head of the plug through the bayonet slot opening of the socket and moving it transversely to seat said stem in the smaller diameter opening of the slot.

2. A connector system according to claim 1 wherein said body comprises serrated locking teeth on its outer surface and has a longitudinal slot, and said means for locking the body in the other part comprises a wedge at the end of said body slot, said wedge extending axially beyond said body, and break-away means connecting said wedge to said body.

3. A connector according to claim 1 wherein said side wall of said socket has diametrically opposed parallel slots.

4. A connector according to claim 3 further comprising circumferential slots extending in the same direction from said parallel slots to form an L-shaped slot arrangement.

5. A connector according to claim 1 further comprising locking ribs on the inner surface of said sidewall, said locking ribs providing said means for retaining said spacer disk within the wall of said socket.

6. A connector according to claim 2 wherein said plug is of a molded plastic material, and said wedge comprises, a wedge molded integral with said body and connected thereto along a breakaway region at the end of the body.

7. A connector according to claim 6 wherein said wedge comprises, a flat-sided wedge.

8. A connector according to claim 7 wherein said body along the inside surfaces of said slot comprises a plurality of locking ribs, and said wedge comprises a plurality of external locking ribs for locking with the body ribs when said wedge is forced into the slot.

9. A connector according to claim 2 wherein said wedge has a length corresponding to the length of the body slot of said plug.

10. A connector according to claim 2 wherein said head of said plug has an axial opening extending inwardly therein, and said wedge has an axial opening extending from its free end.

11. A connector according to claim 2 further comprising a flange on said plug body adjacent said stem and spaced from said plug head by a distance equal to the thickness of the material of the socket defining the small diameter portion of the bayonet opening of said sleeve, and tapered surface means between said larger and smaller diameter openings of said bayonet slot for engaging said plug head to pull said plug axially toward said sleeve as said stem is seated in the smaller diameter portion of the bayonet slot.

12. A connector system for joining two parts, for example furniture parts, comprising:
   a cylindrical socket having a side wall and a connecting end, and adapted to be inserted in one of the parts to be joined with its connecting end flush with the surface of the part, said connecting end having a bayonet slot opening,
   said side wall having a longitudinal slot and a radially projecting saw-tooth shaped locking flange at its free end,
   a plug having a body adapted to be inserted and locked in the other of the parts to be joined and comprising, a head connected to the body by a stem, said head having a diameter to be received in a larger diameter opening of the bayonet slot and lock behind a smaller diameter opening of the slot, and said stem having a diameter corresponding to the diameter of the smaller diameter opening of the bayonet slot,
   said body having a diameter to be inserted in an opening of said other part to be joined,
   means for securing the body in said other part, and
   means for retaining said plug in said seated position in said socket, and comprising locking lugs on opposite sides of said bayonet slot, and a flange on said plug body adjacent the inner end of said stem, said lugs being spaced apart by a distance slightly less than the diameter of said flange to grip said flange and hold said plug in said seated position,
   said parts being joined by inserting the head of the plug through the bayonet slot opening of the socket and moving it transversely to seat said stem in the smaller diameter opening of the slot.

13. A connector according to claim 12 wherein said locking lugs project outwardly beyond said connector end of said socket.

14. A connector according to claim 12 further comprising annular reinforcements for and integral with said locking lugs, said reinforcements projecting outwardly from said connector end of said socket to enhance the rigidity of said lugs.

15. A connector according to claim 1 further comprising opposed flat sides on said socket wall, said longitudinal slot opening through one of said flat sides, and said flat sides extending a substantial length of the side wall of said socket.

* * * * *

UNITED STATES PATENT AND TRADEMARK OFFICE
CERTIFICATE OF CORRECTION

PATENT NO. : 4,197,029

DATED : April 8, 1980

INVENTOR(S) : Jean-Marc Barreau et al.

It is certified that error appears in the above—identified patent and that said Letters Patent is hereby corrected as shown below:

In the heading, Item [32] Priority date should read -- November 8, 1977--.

Signed and Sealed this

Seventeenth Day of June 1980

[SEAL]

Attest:

SIDNEY A. DIAMOND

Attesting Officer

Commissioner of Patents and Trademarks